(12) United States Patent
Sakakibara et al.

(10) Patent No.: US 7,069,358 B2
(45) Date of Patent: Jun. 27, 2006

(54) DISK ARRAY SYSTEM AND DISK DRIVE UNIT

(75) Inventors: Yasuhiro Sakakibara, Odawara (JP); Hiroshi Suzuki, Sagamihara (JP); Hiromi Matsushige, Hiratsuka (JP); Masato Ogawa, Chigasaki (JP)

(73) Assignee: Hitachi, Ltd., Tokyo (JP)

(*) Notice: Subject to any disclaimer, the term of this patent is extended or adjusted under 35 U.S.C. 154(b) by 48 days.

(21) Appl. No.: 10/745,573

(22) Filed: Dec. 29, 2003

(65) Prior Publication Data

US 2005/0080989 A1    Apr. 14, 2005

(30) Foreign Application Priority Data

Oct. 9, 2003   (JP) .............................. 2003-351031

(51) Int. Cl.
  G06F 13/12   (2006.01)
  G06F 13/38   (2006.01)

(52) U.S. Cl. .................... 710/74; 710/62; 710/72; 439/924.1; 439/924.2

(58) Field of Classification Search ............... 710/2, 710/5, 36, 39, 52, 62, 72, 74, 305, 306; 711/100, 711/111–114; 439/924.1, 924.2
See application file for complete search history.

(56) References Cited

U.S. PATENT DOCUMENTS

| | | | | |
|---|---|---|---|---|
| 3,432,795 | A | * | 3/1969 | Jayne ........................ 439/60 |
| 5,325,363 | A | | 6/1994 | Lui |
| 5,335,327 | A | * | 8/1994 | Hisano et al. ............... 711/131 |
| 5,541,787 | A | * | 7/1996 | Jabbari et al. ........... 360/97.01 |
| 5,583,876 | A | * | 12/1996 | Kakuta ........................ 714/766 |
| 5,636,356 | A | * | 6/1997 | Kakuta et al. ............... 711/114 |
| 5,675,816 | A | | 10/1997 | Hiyoshi et al. |
| 5,768,117 | A | | 6/1998 | Takahashi et al. |
| 5,784,641 | A | * | 7/1998 | Sueyoshi et al. ............... 710/2 |
| 5,790,374 | A | | 8/1998 | Wong |
| 5,842,030 | A | | 11/1998 | Larabell et al. |
| 5,886,424 | A | | 3/1999 | Kim |

(Continued)

FOREIGN PATENT DOCUMENTS

JP    9-91852    4/1987

(Continued)

OTHER PUBLICATIONS

Caen Engineering Inc, 20001, UE900 11 Half-Height Device Bay Dual Power Supply, 6U Universal Raid Enclosure.*

(Continued)

*Primary Examiner*—Henry W. H. Tsai
*Assistant Examiner*—David Martinez
(74) *Attorney, Agent, or Firm*—Mattingly, Stanger, Malur & Brundidge, P.C.

(57) ABSTRACT

A disk array system including: at least one channel control portion for receiving an input/output request of data from an information processor and exchanging the data with the information processor; at least one disk control portion for exchanging the data with a disk drive in accordance with the input/output request; a cache memory for storing the data exchanged between the channel control portion and the disk control portion; a cache switch for forming a communication path between the channel control portion and the cache memory; a shared memory for storing the input/output request exchanged between the channel control portion and the disk control portion; and at least one disk drive unit including the disk drive, and a canister for storing the disk drive; wherein the canister is provided with a power unit for supplying electric power to the drive device for driving the disk drive.

1 Claim, 15 Drawing Sheets

U.S. PATENT DOCUMENTS

| | | |
|---|---|---|
| 5,915,122 A | 6/1999 | Tsurumi |
| 6,012,124 A | 1/2000 | Kamo et al. |
| 6,016,252 A | 1/2000 | Pignolet et al. |
| 6,029,199 A | 2/2000 | Allen et al. |
| 6,094,725 A | 7/2000 | Hiyoshi et al. |
| 6,204,574 B1 | 3/2001 | Chi ............................ 307/66 |
| 6,231,224 B1 | 5/2001 | Gamble et al. |
| 6,275,573 B1 | 8/2001 | Coale et al. |
| 6,317,839 B1 | 11/2001 | Wells |
| 6,467,047 B1 | 10/2002 | Scaringella et al. ........... 714/6 |
| 6,504,350 B1 | 1/2003 | Leonowich ................. 323/281 |
| 6,510,050 B1 | 1/2003 | Lee et al. |
| 6,520,809 B1* | 2/2003 | Son ........................... 439/679 |
| 6,636,933 B1* | 10/2003 | MacLellan et al. ......... 710/317 |
| 6,883,065 B1* | 4/2005 | Pittelkow et al. ........... 711/114 |
| 2001/0026462 A1 | 10/2001 | Tokunaga et al. ............. 363/97 |
| 2001/0049799 A1 | 12/2001 | Morita et al. .................. 714/6 |
| 2002/0032875 A1 | 3/2002 | Kashani |
| 2002/0071292 A1 | 6/2002 | Alhara et al. |
| 2002/0078290 A1* | 6/2002 | Derrico et al. .............. 710/302 |
| 2002/0087899 A1 | 7/2002 | Kano et al. |
| 2002/0144044 A1* | 10/2002 | Moon et al. ................. 710/302 |
| 2002/0196601 A1 | 12/2002 | Lee et al. |
| 2003/0041278 A1 | 2/2003 | Lin |
| 2003/0107906 A1 | 6/2003 | Tokunaga et al. ............. 363/89 |
| 2003/0177404 A1 | 9/2003 | Jorgenson et al. |
| 2003/0200472 A1 | 10/2003 | Midoriwaka et al. |
| 2003/0217300 A1 | 11/2003 | Fukumori et al. |
| 2004/0003306 A1 | 1/2004 | Oomori |
| 2004/0034737 A1* | 2/2004 | Fujimoto et al. ........... 711/114 |
| 2004/0068670 A1 | 4/2004 | Suzuki et al. |
| 2004/0078663 A1 | 4/2004 | Inaba |
| 2004/0088589 A1 | 5/2004 | Westerinen et al. |
| 2004/0111560 A1 | 6/2004 | Takase et al. |
| 2004/0181699 A1 | 9/2004 | Katoh et al. |
| 2004/0193791 A1 | 9/2004 | Felton et al. |
| 2004/0199353 A1 | 10/2004 | Bingham et al. |
| 2004/0255174 A1 | 12/2004 | Chen et al. |
| 2005/0021906 A1* | 1/2005 | Nakamura et al. .......... 711/113 |
| 2005/0081068 A1 | 4/2005 | Sakakibara et al. |

FOREIGN PATENT DOCUMENTS

| | | |
|---|---|---|
| WO | WO 93/23805 | 11/1993 |

OTHER PUBLICATIONS

Transistor Gijutsu Special No. 28, 2d Ed., CQ Publishing Co., Ltd., Jan. 20, 1993, pp. 4 and 7. (English Translation of Relevant Portions).

* cited by examiner

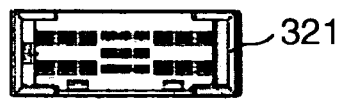
FIG.16A
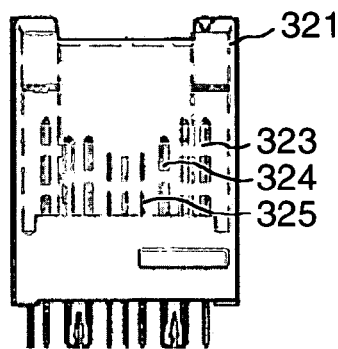 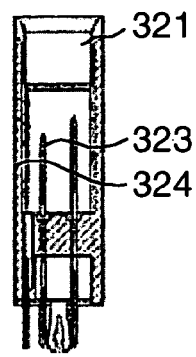 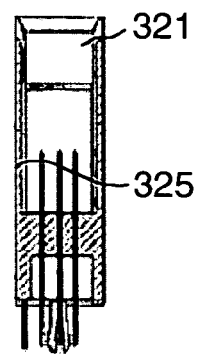
FIG.16B  FIG.16C  FIG.16D
FIG.17
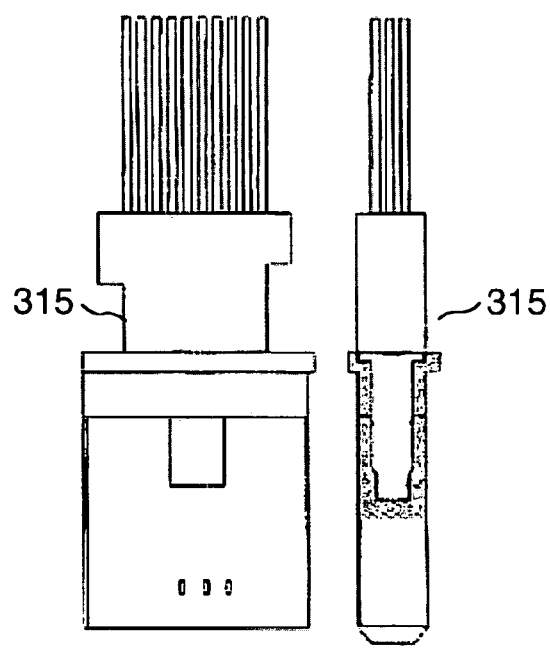

DISK ARRAY SYSTEM AND DISK DRIVE UNIT

CROSS REFERENCE TO RELATED APPLICATION

This invention relates to a patent applications Ser. No. 10/745,571, filed Dec. 29, 2003, "DISK ARRAY SYSTEM" by Y. SAKAKIBARA et al., Ser. No. 10/802,913, filed Mar. 18, 2004, entitled "STORAGE SYSTEM", by H. SUZUKI, et al and Ser. No. 10/463.723, filed Jun. 16, 2003, entitled "DISK ARRAY DEVICE AND METHOD OF SUPPLYING POWER TO DISK ARRAY DEVICE", claiming foreign priority benefits under 35 U.S.C. Section 119 of Japanese Patent Application No. 2003-351031.

FIELD OF THE INVENTION

The present invention relates to a disk array system and a disk drive unit.

BACKGROUND OF THE INVENTION

Increase in capacity of a disk array system has advanced with recent increase in quantity of data used in an information processing system. The number of disk drives mounted in the disk array system has increased with the advance of increase in capacity of the disk array system.

On the other hand, greater reduction in size of the disk array system has been required for effective use of a limited installation space. Disk drives must be mounted densely in such a limited space because of the reduction in size. Therefore, a mechanism for performing maintenance of the disk array system efficiently, such as specification of a fault location or easy pursuit of the cause of an obstacle, need to be provided in the disk array system.

SUMMARY OF THE INVENTION

The present invention is developed upon such circumstances and a chief object of the present invention is to provide a disk array system and a disk drive unit.

To achieve the foregoing object, the present invention provides a disk array system including: at least one channel control portion for receiving an input/output request of data from an information processor and exchanging the data with the information processor; at least one disk control portion for exchanging the data with a disk drive in accordance with the input/output request; a cache memory for storing the data exchanged between the channel control portion and the disk control portion; a cache switch for forming a communication path between the channel control portion and the cache memory; a shared memory for storing the input/output request exchanged between the channel control portion and the disk control portion; and at least one disk drive unit including the disk drive, and a canister for storing the disk drive; wherein the canister is provided with a power unit for supplying electric power to the drive device for driving the disk drive. The disk array system may further includes a plurality of disk drive units provided as defined above and disposed adjacently, wherein the canister of each of the disk drive units is provided with at least one light-emitting device for indicating an operating state of the disk drive stored in the canister.

The concept "disk drive" means a device having a recording medium (disk) for recording data. For example, a hard disk device or a semiconductor storage device may be used as the disk drive. Such a disk drive is stored in a canister to form a disk drive unit. Disk drive units formed in this manner are provided to form a disk array system.

The concept "electric power for driving the disk drive", for example, includes electric power supplied to a motor for rotating a disk, and electric power supplied to a control circuit of the disk drive. The electric power for driving the disk drive can be provided as DC power. The power unit is a device by which electric power taken in from the outside of the disk drive unit is converted into electric power for driving the disk drive. When, for example, the electric power taken in from the outside of the disk drive unit is DC power, the power unit can be provided as a DC-DC converter for converting the voltage of the DC power into a voltage for driving the disk drive. It is a matter of course that when the electric power taken in from the outside of the disk drive unit is AC power, the power unit may be provided as an AC-DC converter for converting the AC power into DC power for driving the disk drive.

Because the power unit is provided in the canister of each disk drive unit, electric power necessary for each disk drive unit can be output from the power unit. Accordingly, such a large-size power unit as provided in a conventional disk array system on the assumption of the maximum number of disk drive units can be dispensed with, so that reduction in size of the disk array system can be achieved. That is, a power unit having a size corresponding to the scale of the disk array system can be provided in accordance with a range of from a small-scale disk array system having a small number of disk drive units to a large-scale disk array system having a large number of disk drive units. The amount of electric power derived from the power unit can be also set in accordance with the scale of the disk array system.

Moreover, when a fault occurs in a certain power unit, the influence of the fault can be suppressed within a disk drive unit having the power unit. Even in the case where one disk drive stops in the condition that a plurality of disk drives form an RAID (Redundant Arrays of Inexpensive Disks) system, data stored in another disk drive can be used so that data reading/writing can be continued. In a disk array system requiring high availability and high reliability, it is therefore very important that the influence of a fault in a certain power unit can be suppressed within one disk drive unit having the power unit. For this reason, both reliability and availability of the disk array system can be improved. Moreover, when a fault occurs in a power unit, only one disk drive unit having the fault need be exchanged. Accordingly, efficiency in maintenance can be improved.

Moreover, when a plurality of disk drive units are disposed adjacently, at least one light-emitting device for indicating the operating state of each disk drive may be provided in the canister of each disk drive unit so that the operating state of each disk drive unit can be grasped rapidly and accurately. Accordingly, efficiency in maintenance of the disk array system can be improved.

Other objects disclosed in the present invention and means for achieving the objects will become clear from the following best mode for carrying out the present invention and the accompanying drawings.

According to the present invention, there can be provided a disk array system and a disk drive unit that can fulfill various effects described in the following embodiments.

BRIEF DESCRIPTION OF THE DRAWINGS

Preferred embodiments of the present invention will now be described in conjunction with the accompanying drawings, in which:

FIGS. 16A to 16D are views showing a first connector in this embodiment; and FIG. 17 is a view showing a second connector in this embodiment.

DESCRIPTION OF THE EMBODIMENTS

External Appearance of Disk Array System

The visual configuration of a disk array system 100 according to an embodiment of the present invention will be described first with reference to FIGS. 1 and 2.

Figure 1:
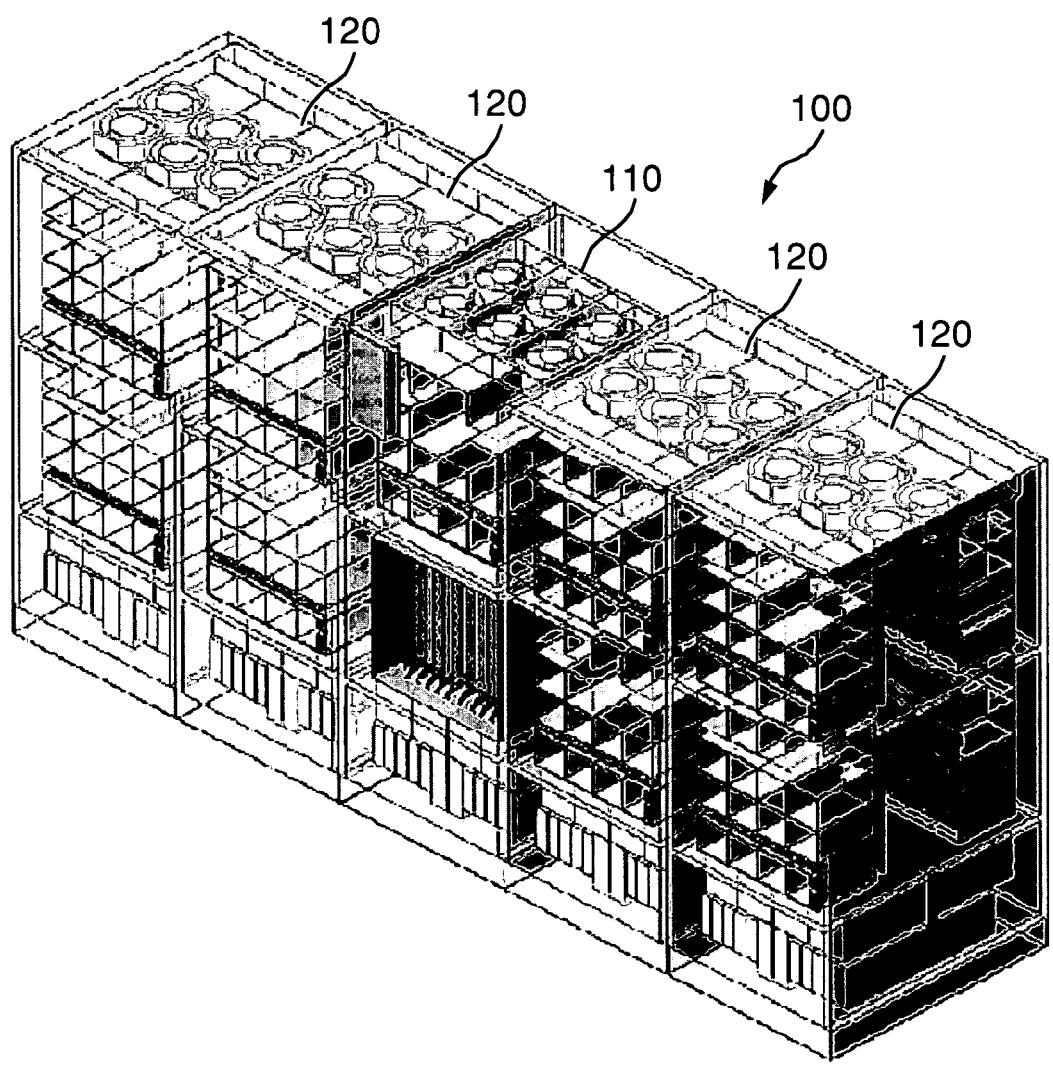
FIG. 1 is a view showing a visual configuration of a disk array system according to an embodiment of the present invention.
Figure 2:
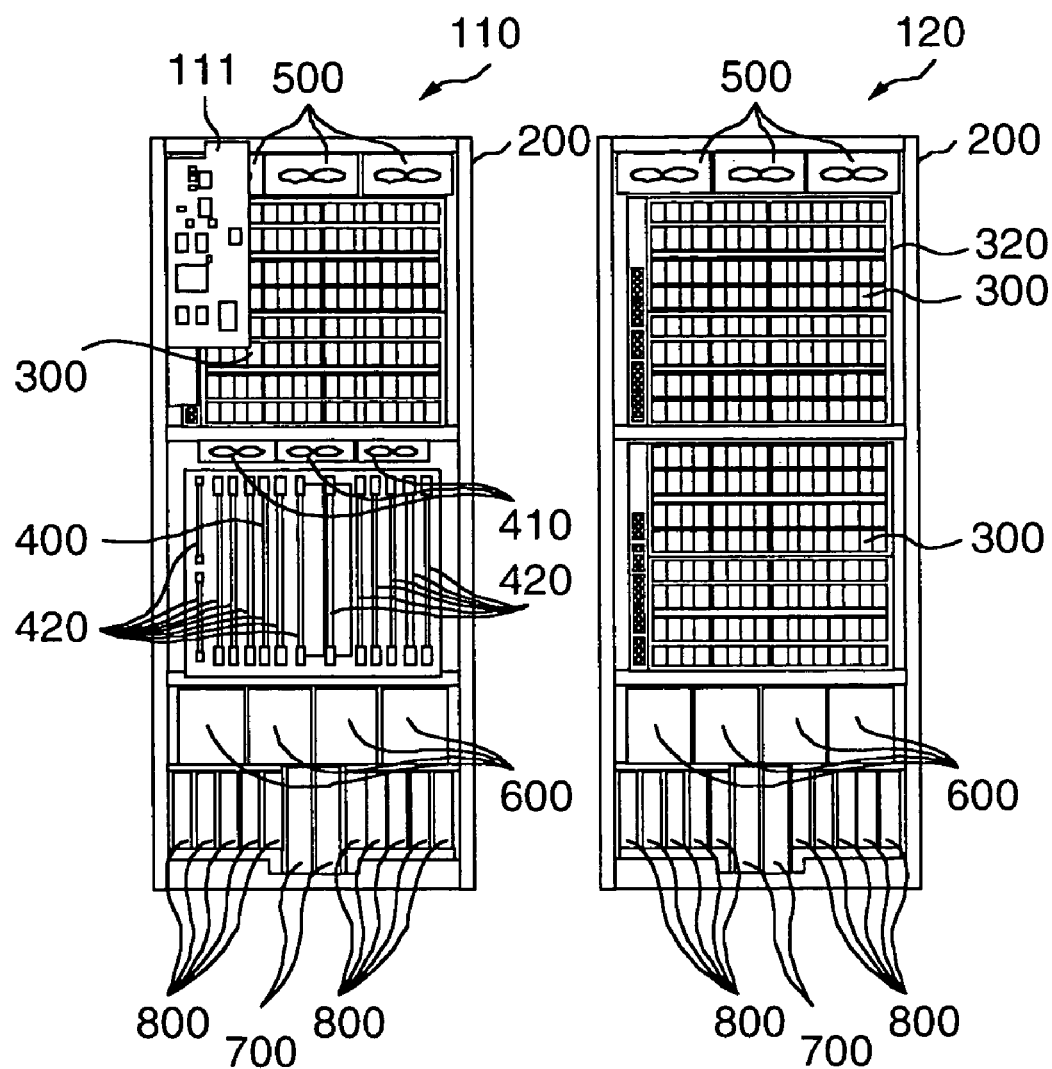
FIG. 2 is a view showing a visual configuration of a control station and a drive station in this embodiment.

The disk array system 100 shown in FIG. 1 includes a control station 110, and drive stations 120. In this embodiment shown in FIG. 1, one control station 110 is disposed in the center and two drive stations 120 are disposed in each of the left and right of the control station 110.

The control station 110 conducts controlling of the disk array system 100 as a whole. The control station 110 includes disk drive modules 300, logic modules 400, batteries 800, AC boxes 700, AC-DC power supplies 600, fans 500, and an operator panel 111.

The disk drive modules 300 are stored in an upper stage of a casing 200. A drive storage portion 320 is formed in the disk drive modules 300 so that a plurality of disk drive units 310 for storing data can be stored in the drive storage portion 320. The plurality of disk drive units 310 are detachably disposed in the drive storage portion 320 so as to be adjacent to one another. A state in which a certain disk drive unit 310 is stored in the drive storage portion 320 will be described later.

Figure 6:
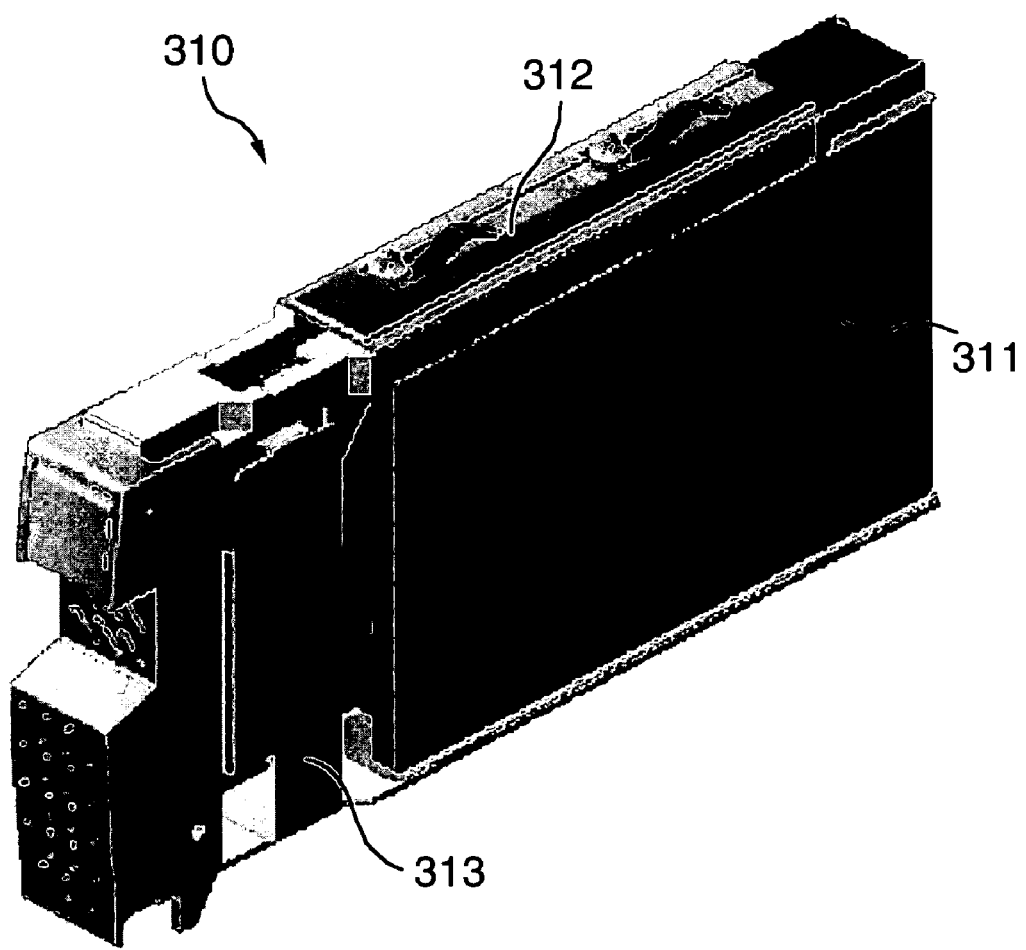
FIG. 6 is a view showing a visual configuration of a disk drive unit according to this embodiment.
Figure 7:
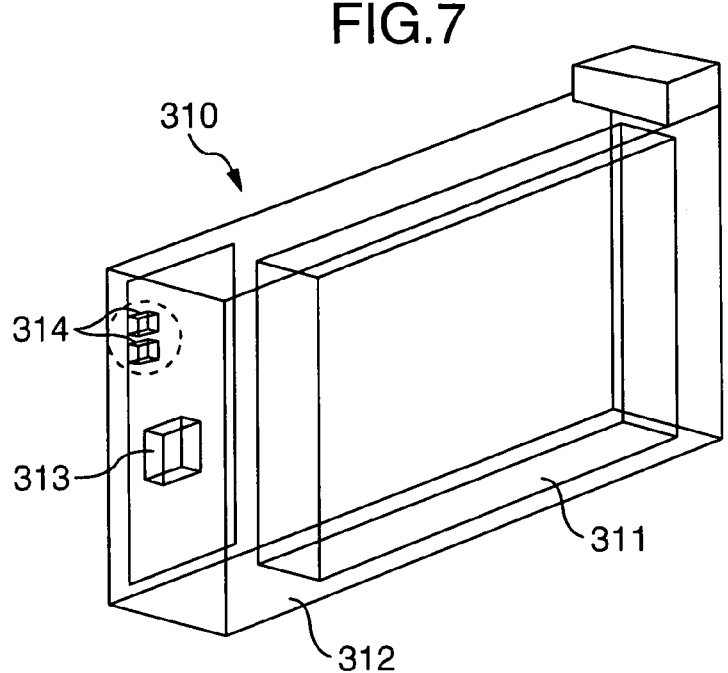
FIG. 7 is a view showing a configuration of the disk drive unit according to this embodiment.

Each of the disk drive units 310 is provided in such a manner that a recording medium-containing disk drive 311, a DC-DC converter (a power supply for outputting electric power for driving the disk drive 311) 313 and LEDs (Light Emitting Diodes) for indicating an operating state of the disk drive 311 are stored in a canister (a casing for storing the disk drive 311) 312. FIG. 6 shows a visual configuration of each disk drive unit 310. FIG. 7 shows a state in which a disk drive 311, a DC-DC converter 313 and LEDs 314 are provided in a canister 312. In the disk drive unit 310 according to this embodiment, red and green LEDs 314 and a DC-DC converter 313 are stored in a front side of the canister 312. As will be described later in detail, the green LED 314 is turned on while data are read/written from/in the disk drive 311. Because reading/writing of data from/in the disk drive 311 is generally made intermittently, the green LED 314 looks to blink. On the other hand, the red LED 314 is turned on when the disk drive unit 310 can be detached from the disk drive modules 300. On/off control of the red LED 314 will be described later.

The logic modules 400 are stored in a middle stage of the casing 200. The logic modules 400 have logic portions 420, and logic module fans 410. The logic portions 420 are formed as boards having various functions for controlling the disk array system 100. As will be described in detail with reference to FIG. 3, the logic portions 420 provide various functions of a channel adapter 131, a cache memory 133, a shared memory 135, a cache switch 132 and disk adapters 134. The logic module fans 410 are devices for generating cooling air to air-cool the logic portions 420. Cooling air that goes into the casing 200 at the front side of the logical modules 400 through respective gaps of the Logic portions 420 is sucked in by the logic module fans 410 and the fans 500 and discharged from a ceiling portion of the casing 200 to the outside of the casing 200.

The batteries 800, the AC boxes 700 and the AC-DC power supplies 600 are stored in a lower stage of the casing 200. The batteries 800, the AC boxes 700 and the AC-DC power supplies 600 are hereinafter generically named "power supply portion".

Each of the AC boxes 700 is an AC power inlet for the disk array system 100 and functions as a breaker. AC power taken in the AC boxes 700 is supplied to the AC-DC power supplies 600.

The AC-DC power supplies 600 are power supply devices for converting AC power into DC power and supplying the DC power to the logic portions 420 and the disk drive units 310. The logic portions 420 and the disk drive units 310 may be different in terms of rated voltage with respect to DC power consumed. For example, in this embodiment, two kinds of DC power with rated voltages of 5 V and 3.3 V are consumed by the logic portions 420 whereas two kinds of DC power with rated voltages of 5V and 12 V are consumed by the disk drive units 310. In this embodiment, therefore, the logic portions 420 and the disk drive units 310 are provided with DC-DC converters (power supply devices) respectively so that DC power with the same rated voltage can be supplied from the AC-DC power supplies 600 to the logic portions 420 and the disk drive units 310. Specifically, each of the AC-DC power supplies 600 converts AC power with a voltage of 200 V into DC power with a rated voltage of 56 V and outputs the DC power. The DC-DC converter provided in each of the logic portions 420 and the disk drive units 310 receives DC power in a voltage range of from 36

V to 60 V as input power and converts it into DC power with a rated voltage as output power required for each of the logic portions 420 and the disk drive units 310. It is a matter of course that the aforementioned rated voltages are shown as an example, and that the rated voltages can be selected optionally.

Figure 5:
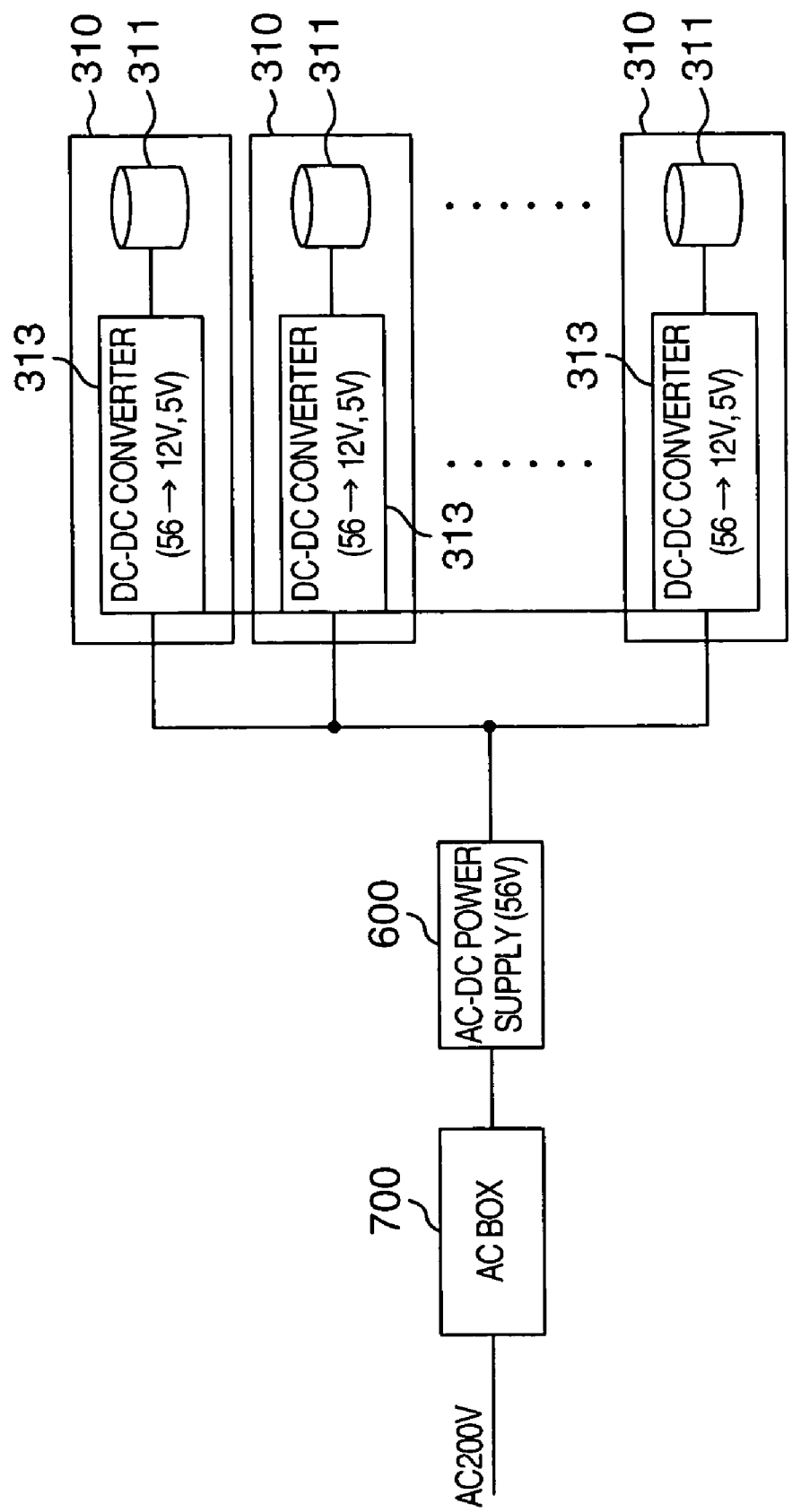
FIG. 5 is a diagram showing a configuration for supplying electric power to disk drive units in this embodiment.

FIG. 5 is a diagram showing a state in which AC power with a voltage of 200 V is converted into two kinds of DC power with voltages of 5 V and 12 V for driving the disk drive units 310 in the disk array system 100 according to this embodiment.

Referring back to FIGS. 1 and 2, the batteries 800 are backup power supply devices that are substituted for the AC-DC power supplies 600 under power failure or under abnormality of the AC/DC power supplies 600 in order to supply DC power to devices, such as disk drives 311 and logic portions 420, of the control station 110. For example, the batteries 800 output DC power with a voltage of 54 V. Although this embodiment is configured so that the rated voltage in output DC power of the batteries 800 is lower than the rated voltage in output DC power of the AC-DC power supplies 600, the DC-DC converters provided in the logic portions 420 and the disk drive units 310 respectively can receive DC power in a range of from 36 V to 60 V as described above. For this reason, devices as constituent members of the disk array system 100 can be driven even in the case where the rated voltage in output DC power of the batteries 800 is 54 V. It is a matter of course that the rated voltage in output DC power of the batteries 800 may be set to be equal to the rated voltage in output DC power of the AC-DC power supplies 600.

In this embodiment, the batteries 800 are charged with a voltage of 54 V whereas the voltage input to the DC-DC converters provided in the control portions 420 and the disk drive units 310 is 60 V at the most. It is therefore preferable that the output voltage of the AC-DC power supplies 600 is selected to be in a range of from 54 V to 60 V. For example, the output voltage of the AC-DC power supplies 600 is more preferably set at 56 V as in this embodiment. When the output voltage of the AC-DC power supplies 600 is selected to be in a range of from 54 V to 60 V as described above, regulation of the output voltage of the batteries 800 can be dispensed with as well as the output voltage of the AC-DC power supplies 600 can be stabilized. Accordingly, both improvement in power efficiency and stability in voltage can be achieved.

The fans 500 are disposed in the ceiling portion of the casing 200. The fans 500 are devices for generating cooling air to air-cool the control station 110. Cooling air that goes into the casing 200 at the front side of the disk drive modules 300 and the logic modules 400 is sucked in by the fans 500 and discharged to the outside of the casing 200.

As shown in FIG. 7, in the disk drive unit 310 according to this embodiment, the DC-DC converter 313 is provided on the front side of the canister 312. Accordingly, the cooling air first cools the DC-DC converter 313 in the canister 312. As a result, the DC-DC converter 313 which is one of heat generating sources can be cooled efficiently.

The operator panel 111 is disposed on the front side of the casing 200. The operator panel 111 is a device for accepting operator's entries for maintenance and management of the disk array system 100.

Each of the drive stations 120 includes disk drive modules 300, batteries 800, AC boxes 700, AC-DC power supplies 600, and fans 500. The devices included in each drive station 120 are the same as those included in the control station 110.

Incidentally, a casing 200 the same as the casing 200 used in the control station 110 is used in each drive station 120. That is, a control station 110 can be provided when the logic modules 400 are stored in the middle stage of the casing 200, and a drive station 120 can be provided when the disk drive modules 300 are stored in the middle stage of the casing 200.

Configuration of Disk Array System

Figure 3:
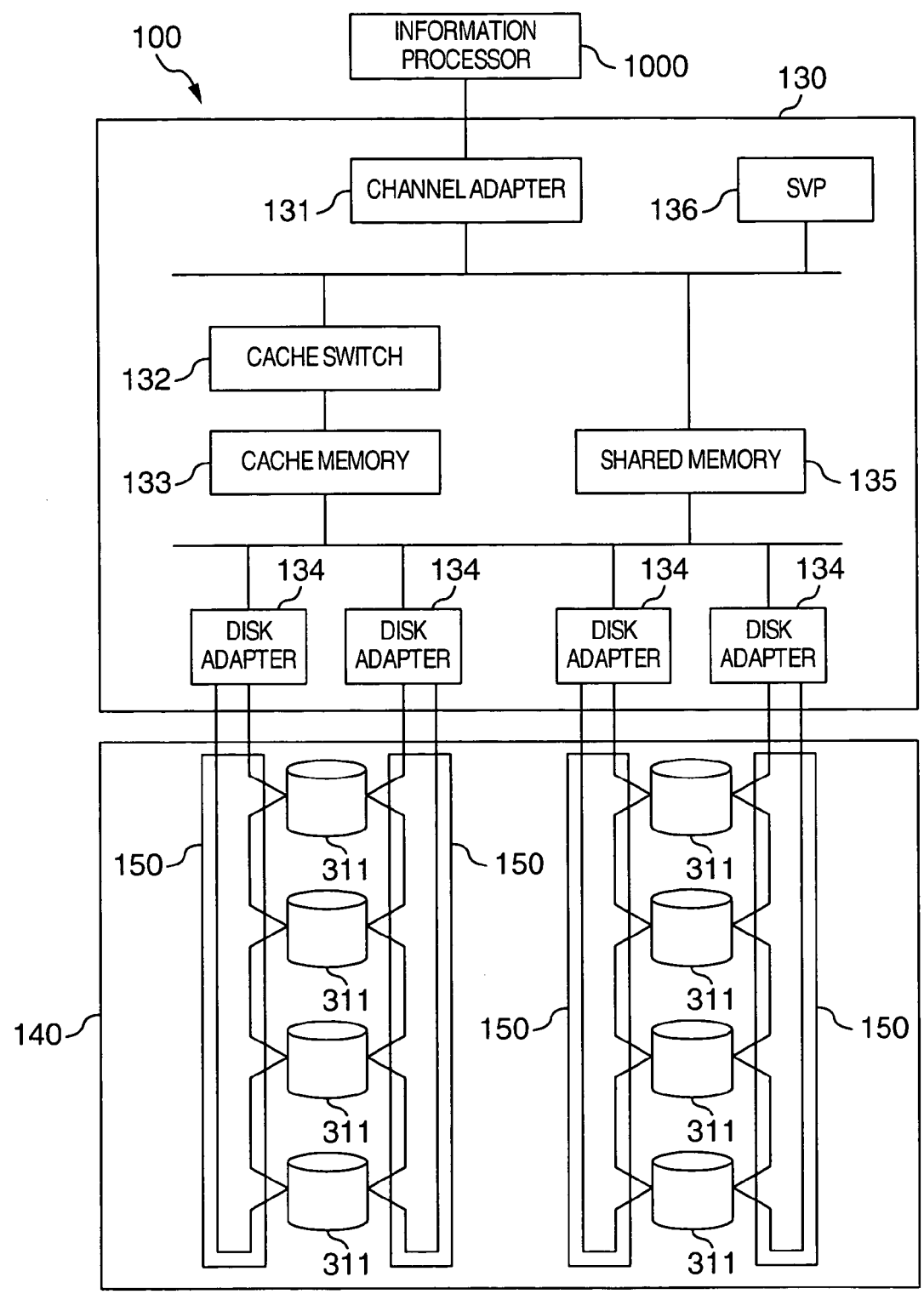
FIG. 3 is a block diagram showing a configuration of the disk array system according to this embodiment.

FIG. 3 is a block diagram showing the configuration of the disk array system 100 according to this embodiment for performing data input/output processing on the basis of a data input/output request given from an information processor 1000. The information processor 1000 is a computer that includes a CPU (Central Processing Unit), and a memory. The CPU included in the information processor 1000 executes various programs to achieve various functions. For example, the information processor 1000 may be used as a key computer in a cash dispensing system of a bank or in an airplane seat reservation system.

In this embodiment, the disk array system 100 includes a disk array control section 130, and a disk array drive section 140. The disk array control section 130 is constituted by the control station 110 shown in FIGS. 1 and 2. The disk array drive section 140 is constituted by the control station 110 and the drive stations 120 shown in FIGS. 1 and 2.

The disk array control section 130 receives a data input/output request from the information processor 1000 and performs data input/output processing for data stored in disk drives 311 included in the disk array drive section 140.

The disk array control section 130 includes a channel adapter (channel control portion for receiving a data input/output request from the information processor and exchanging data with the information processor) 131, a cache memory (cache memory for storing data exchanged between the channel control portion and each disk control portion) 133, a cache switch (cache switch for forming a communication path between the channel control portion and the cache memory) 132, a shared memory (shared memory for storing the input/output request exchanged between the channel control portion and each disk control portion) 135, disk adapters (disk control portions for exchanging data with disk drives in accordance with the input/output request) 134, and a supervisory terminal (referred to as SVP in FIG. 3) 136. The channel adapter 131, the cache memory 133, the cache switch 132, the shared memory 135 and the disk adapters 134 form the logic portions 420 shown in FIG. 2, respectively.

The channel adapter 131 has a communication interface for communicating with the information processor 1000. The channel adapter 131 exchanges data input/output requests, data, etc. with the information processor 1000 through the communication interface. Incidentally, the channel adapter 131 may be provided so that it can exchange data input/output requests, etc. with a plurality of information processors 1000. In this case, the disk array control section 130 may include a plurality of channel adapters 131. The channel adapter 131 may be provided so that it can be connected to the information processor 1000 by a network such as SAN (Storage Area Network).

The cache memory 133 and the shared memory 135 are memories for storing data and commands exchanged between the channel adapter 131 and each disk adapter 134. When, for example, the data input/output request received from the information processor 1000 by the channel adapter 131 is a write request, the channel adapter 131 writes the write request in the shared memory 135 and writes data received from the information processor 1000 in the cache memory 133. Then, the disk adapters 134 read the data from the cache memory 133 in accordance with the write request written in the shared memory 135 and write the data in the disk drives 311.

The cache switch 132 is a switch for forming a communication path between the channel adapter 131 and the cache memory 133.

The disk adapters 134 communicate with the disk drives 311 to perform data input/output to/from the disk drives 311. For example, the data input/output is performed through a communication path that forms a loop (hereinafter referred to as FC-AL loop) defined in fiber channel standard FC-AL. The communication path is formed by use of fiber channel switches (hereinafter referred to as FSWs) 150 provided in the disk array drive section 140. The FSWs 150 will be described later in detail.

The supervisory terminal 136 is a device for maintenance and management of the disk array system 100. For example, the supervisory terminal 136 is a notebook-size collapsible computer included in the control station 110 and having a display unit, and a keyboard unit. It is a matter of course that the supervisory terminal 136 may be provided so as not to be stored in the control station 110. For example, the supervisory terminal 136 may be provided as a remote computer connected by a communication network. Besides the notebook-size computer, a desk top computer may be used as the supervisory terminal 136.

Incidentally, the channel adapter 131, the disk adapters 134, the cache memory 133, the shared memory 135 and the cache switch 132 need not be provided separately. These members 131 to 135 may be integrated into one body or a combination of some members selected from these members 131 to 135 may be integrated into one body.

The channel adapter 131, the disk adapters 134, the cache memory 133, the shared memory 135, the cache switch 132 and the supervisory terminal 136 may be connected to one another by a bus as shown in FIG. 3 or may be connected to one another by a switch or a network. In this case, an LAN (Local Area Network) may be formed as the network.

Fiber Channel Switch (FSW)

Figure 4:
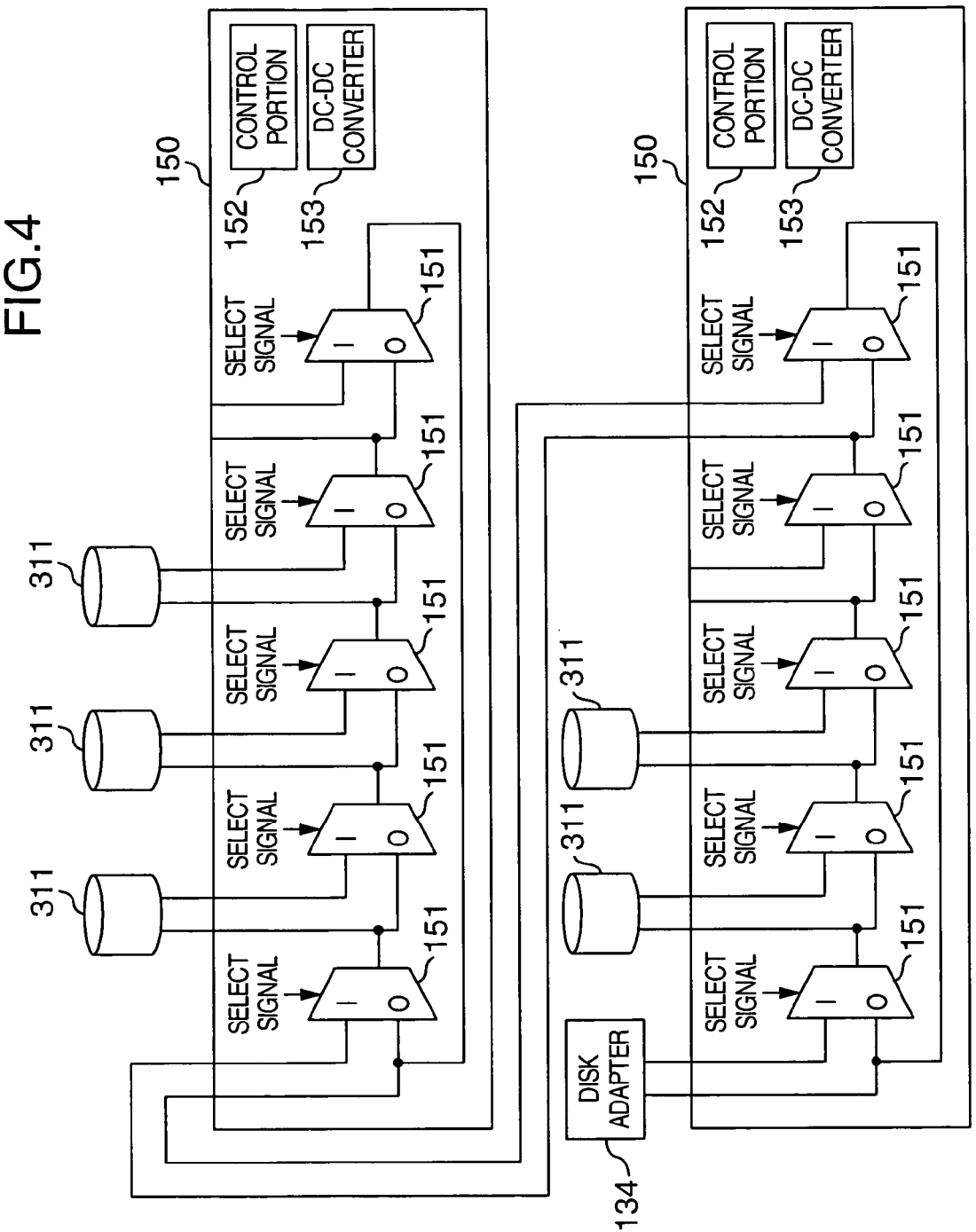
FIG. 4 is a block diagram showing a configuration of fiber channel switches in this embodiment.

FIG. 4 is a diagram showing a state in which a disk adapter 134 is connected to disk drives 311 by a communication path that forms an FC-AL loop.

As shown in FIG. 4, the FC-AL loop can be formed when a disk adapter 134 and disk drives 311 are connected to multiplexers 151 included in FSWs 150. In the example shown in FIG. 4, one FC-AL loop is formed so as to extend over two FSWs 150.

A select signal input to each multiplexer 151 is a signal provided for selecting either "1" input or "0" input of the multiplexer 151. When a disk adapter 134 or a disk drive 311 is connected to a multiplexer 151, a select signal is input to the multiplexer 151 so that the "1" input of the multiplexer 151 is selected. When there is no device connected to a multiplexer 151, a select signal is input to the multiplexer 151 so that the "0" input of the multiplexer 151 is selected. When, for example, failure in a certain disk drive 311 is detected, a select signal is input to a multiplexer 151 connected to the disk drive 311 so that the "0" input of the multiplexer 151 is selected. For example, the select signals input to the multiplexers 151 respectively are controlled by control portions 152. Incidentally, a circuit for controlling the configuration of the FC-AL loop including the multiplexers 151 shown in FIG. 4 is hereinafter referred to as PBC (Port Bypass Circuit).

Each FSW 150 has a control portion 152, and a DC-DC converter 153, as well as the multiplexers 151.

The control portion 152 controls the FSW 150 and controls the red LEDs 314 and the DC-DC converters 313 included in the disk drive units 310. For example, controlling the FSW 150 is controlling the select signals input to the multiplexers 151 respectively. When, for example, a certain disk drive 311 is enabled to communicate with the disk adapter 134 (i.e., a certain disk drive 311 is turned on) or a certain disk drive 311 is disabled from communicating with the disk adapter 134 (i.e., a certain disk drive 311 is turned off), the select signal for the disk drive 311 is controlled by the control portion 152.

The DC-DC converter 153 converts 56 V DC power of the AC-DC power supply 600, for example, into 3.3 V DC power to be consumed by the FSW 150.

On/Off Control of Disk Drive

The on/off control of each of the aforementioned disk drives 311 will be described with reference to FIGS. 8 to 11.

Circuit for Supplying Power to Disk Drive

Figure 8:
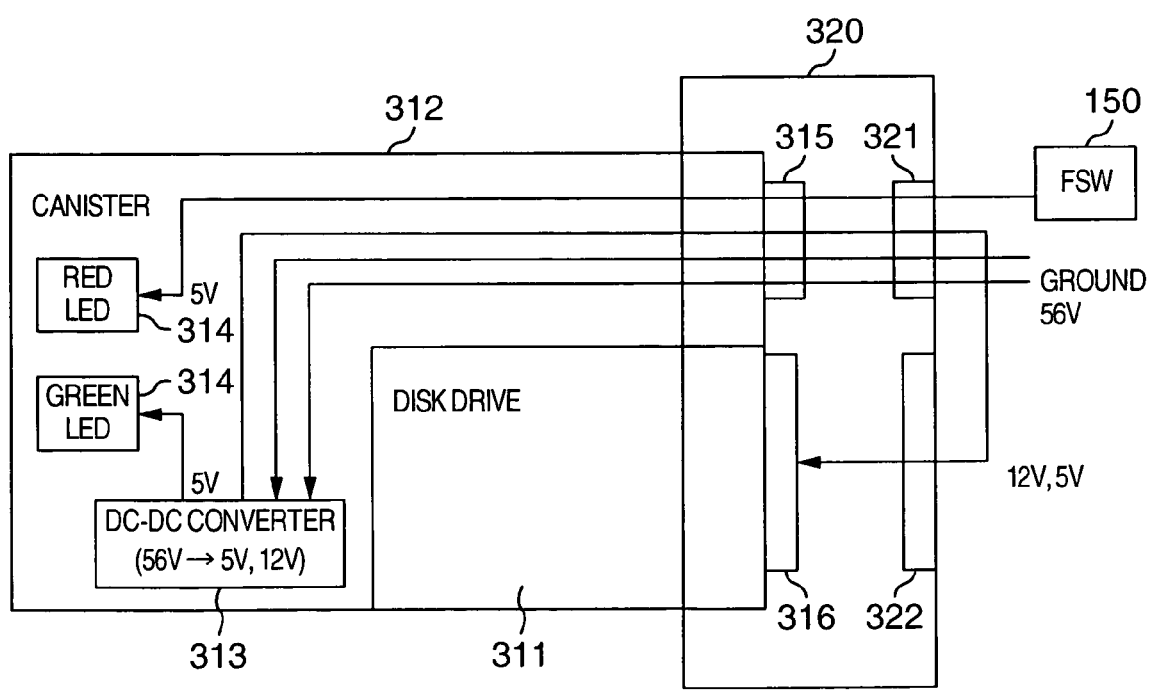
FIG. 8 is a diagram showing a configuration for supplying electric power to the disk drive unit according to this embodiment.

A power supply circuit for supplying DC power to each disk drive unit 310 will be first described with reference to FIG. 8.

To supply DC power to a disk drive unit 310, the disk drive unit 310 is mounted in one of the drive storage portions 320. On this occasion, first and third connectors 321 and 322 of the drive storage portion 320 are fitted (connected) to second and fourth connectors 315 and 316 of the disk drive unit 310, respectively. As a result, DC power is supplied to the DC-DC converter 313, the red and green LEDs 314 and the disk drive 311 of the disk drive unit 310.

FIGS. 16A to 16D show the first connector 321. FIG. 17 shows the second connector 315.

The first connector 321 has first power unit pins 324, first ground potential supply pins 323, and other pins. These pins of the first connector 321 are provided so as to be parallel with the attaching/detaching direction of the disk drive unit 310. The first power unit pins 324 are pins used for supplying power to the DC-DC converter 313 provided in the canister 312 of the disk drive unit 310. The first ground potential supply pins 323 are pins used for supplying the ground potential. The other pins include first power supply pins 325. The first power supply pins 325 are pins used so that power output from the DC-DC converter 313 mounted in the canister 312 of the disk drive unit 310 to drive the disk drive 311 is once led to the drive storage portion 320. As shown in FIGS. 16A to 16D, the lengths of the pins are set so that the ground potential supply pins 323 are longest, the power unit pins 324 are second longest and the other pins are shorter than the ground potential supply pins 323 and the power unit pins 324.

On the other hand, the second connector 315 has second power unit pins, second ground potential supply pins, and other pins. These pins of the second connector 315 are provided so as to be parallel with the attaching/detaching direction of the disk drive unit 310. When the second connector 315 is fitted to the first connector 321, the second power unit pins are brought into contact with the first power unit pins 324 and the second ground potential supply pins are brought into contact with the first ground potential supply pins 323. The other pins of the second connector 315 include second power supply pins which are brought into contact with the first power supply pins 325 when the second connector 315 is fitted to the first connector 321. Though not shown clearly in FIG. 17, the lengths of the pins of the second connector 315 in this embodiment are set to be equal to one another.

For this reason, when the disk drive unit 310 is mounted in the drive storage portion 320, the first and second connectors 321 and 315 can be fitted to each other in such a manner that the first power unit pins 324 are brought into the second power unit pins before the other pins of the first connector 321 are brought into contact with the other pins of the second connector 315, and that the first ground potential supply pins 323 are brought into contact with the second ground potential supply pins before the first power unit pins 324 are brought into the second power unit pins.

Accordingly, when the disk drive unit 310 is mounted in the drive storage portion 320, DC power can be supplied to the disk drive unit 310 in such a manner that 56 V DC power is supplied to the DC-DC converter 313 after the ground potential of the DC-DC converter 313 is stabilized. As a result, two kinds of DC power with stabilized voltages of 5 V and 12 V can be output from the DC-DC converter 313. Because the two kinds of DC power with stabilized voltages of 5 V and 12 V are supplied to the disk drive 311, etc., reliability of communication for data input/output between the disk drive 311 and the disk adapter 134 can be improved.

Referring back to FIG. 8, the ground potential is supplied to the DC-DC converter 313 through the first ground potential supply pins 323 of the first connector 321 and the second ground potential supply pins of the second connector 315. The ground potential may be derived from a ground point (earth point) provided suitably in the disk array system 100 or may be derived, for example, from the AC-DC power supply 600. Then, 56 V DC power is supplied from the AC-DC power supply 600 to the DC-DC converter 313 through the first power unit pins 324 of the first connector 321 and the second power unit pins of the second connector 315. As a result, the DC-DC converter 313 can output two kinds of DC power with stabilized voltages of 5 V and 12 V.

The red LED 314 is supplied with 5 V DC power output from the control portion 152 of the FSW 150 through the other pins of the first connector 321 and the other pins of the second connector 315. As a result, the control portion 152 of the FSW 150 can control the on/off action of the red LED 314. The green LED 314 is supplied with 5 V DC power output from the DC-DC converter 313.

The disk drive 311 is supplied with two kinds of DC power with voltages of 5 V and 12 V output from the DC-DC converter 313 through the second power supply pins of the second connector 315, the first power supply pins of the first connector 321, third power supply pins of the third connector 322 and fourth power supply pins of the fourth connector 316. Because the two kinds of DC power output from the DC-DC converter 313 are supplied to the disk drive 311 while once passed through the drive storage portion 320 in this manner, even a conventional disk drive 311 which is designed based on no consideration given to the provision of the DC-DC converter 311 in the canister 312 can be used as it is. Incidentally, the third and fourth power supply pins are pins provided in the third and fourth connector 322 and 316 respectively so as to be parallel with the attaching/detaching direction of the disk drive unit 310. When the fourth connector 316 is fitted to the third connector 322, the fourth power supply pins are brought into contact with the third power supply pins so that the two kinds of DC power output from the DC-DC converter 313 can be supplied to the disk drive 311 in order to drive the disk drive 311 while once passed through the drive storage portion 320. The lengths of the third and fourth power supply pins are set in such a manner that the first power supply pins are brought into contact with the second power supply pins before the third power supply pins are brought into contact with the fourth power supply pins. For example, as shown in FIG. 8, the third and fourth connectors 322 and 316 may be provided so that the distance between the third and fourth connectors 322 and 316 is larger than the distance between the first and second connectors 321 and 315. In this case, the distance between the third power supply pins and the fourth power supply pins can be made larger than the distance between the first power supply pins and the second power supply pins so that the first power supply pins are brought into contact with the second power supply pins before the third power supply pins are brought into contact with the fourth power supply pins.

As a result, when the disk drive unit 310 is mounted in the drive storage portion 320, the two kinds of DC power with voltages of 5 V and 12 V output from the DC-DC converter 313 can be prevented from being supplied to the disk drive 311 before the two kinds of DC voltage are stabilized. Accordingly, stabilization of the operation of the disk drive 311 can be attained.

Disk Drive On

The control for turning the disk drive 311 on will be described below with reference to FIGS. 9 and 10. As described above, turning the disk drive 311 on means enabling the disk drive 311 to communicate with the disk adapter 134.

Figure 9:
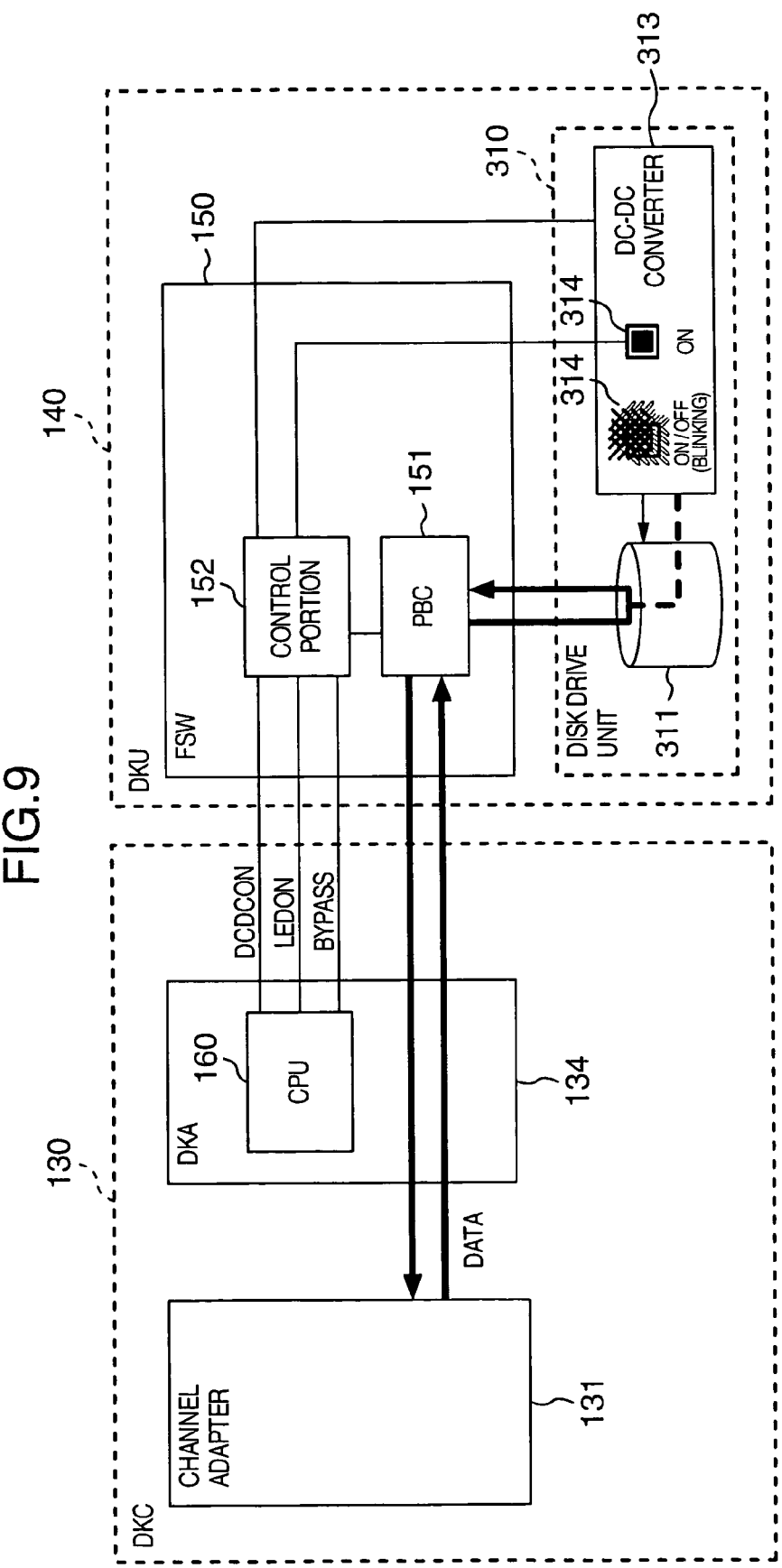
FIG. 9 is a diagram for explaining on/off control of a disk drive in this embodiment.

In FIG. 9, the arrows connecting the channel adapter 131 and the disk drive 311 to each other through the disk adapter 134 and the PBC 151 of the FSW 150 show paths of flow of data to be read/written from/in the disk drive 311. The lines connecting a CPU 160 of the disk adapter 134 to the DC-DC converter 313 and the LED 314 through the control portion 152 of the FSW 150 show control lines for performing control to turn the disk drive 311 on. Incidentally, exclusive signal lines need not be provided between the CPU 160 and the control portion 152 of the FSW 150. For example, registers included in the control portion 152 mounted in the FSW 150 may be accessed by use of a serial or parallel interface so that controlling can be performed between the CPU 160 and the control portion 152 of the FSW 150. Incidentally, the LED 314 connected to the control portion 152 of the FSW 150 is a red LED 314. The other LED 314 is a green LED 314 that blinks automatically in accordance with the operation of reading/writing data from/in the disk drive 311.

Figure 10:
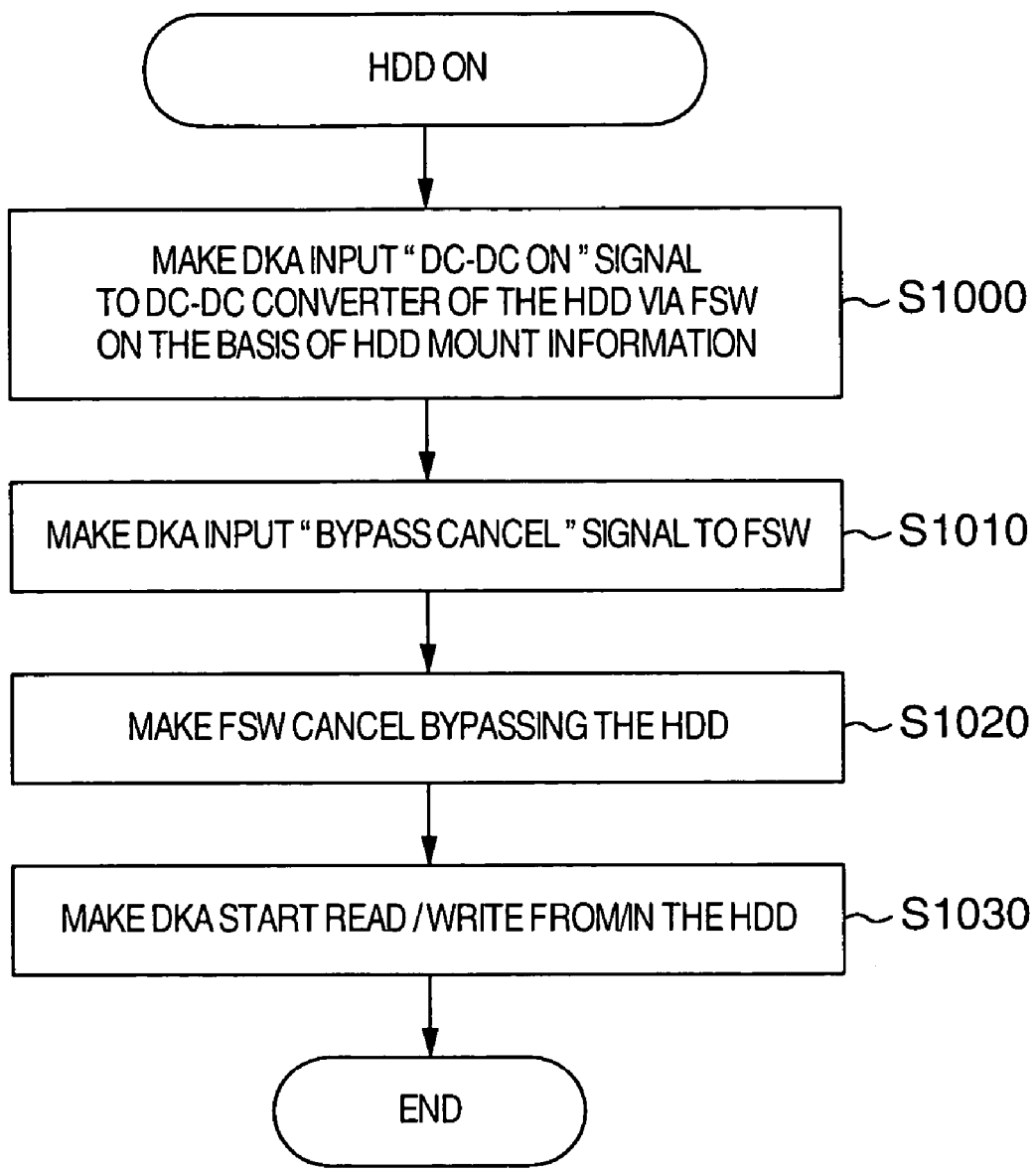
FIG. 10 is a flow chart for explaining a process of turning the disk drive on in this embodiment.

FIG. 10 is a flow chart showing the process of turning the disk drive 311 on. The disk drive 311 is turned on as follows. First, the CPU 160 of the disk adapter 134 inputs a "DC-DC ON" signal to the DC-DC converter 313 via the control portion 152 of the FSW 150 (S1000). The "DC-DC ON" signal is a signal for turning the DC-DC converter 313 on. As a result, the DC-DC converter 313 is turned on, so that voltages of 5 V and 12 V are supplied to the disk drive 311. In the step S1000, the disk drive 311 has not been turned on yet. Then, the CPU 160 of the disk adapter 134 inputs a "BYPASS CANCEL" signal to the control portion 152 of the FSW 150 (S1010). The "BYPASS CANCEL" signal is a signal for adding the disk drive 311 to the FC-AL loop. Then, the control portion 152 outputs a select signal in order to select the "1" input of the multiplexer 151 to which the disk drive 311 is connected (S1020). As a result, the disk adapter 134 is enabled to communicate with the disk drive 311, so that data input/output can be allowed. In the step S1020, the disk drive 311 is turned on. Then, the channel adapter 131 starts reading/writing data from/in the disk drive 311 via the disk adapter 134 (S1030). The green LED 314 blinks automatically in accordance with the operation of reading/writing data from/in the disk drive 311.

Disk Drive Off

Figure 11:
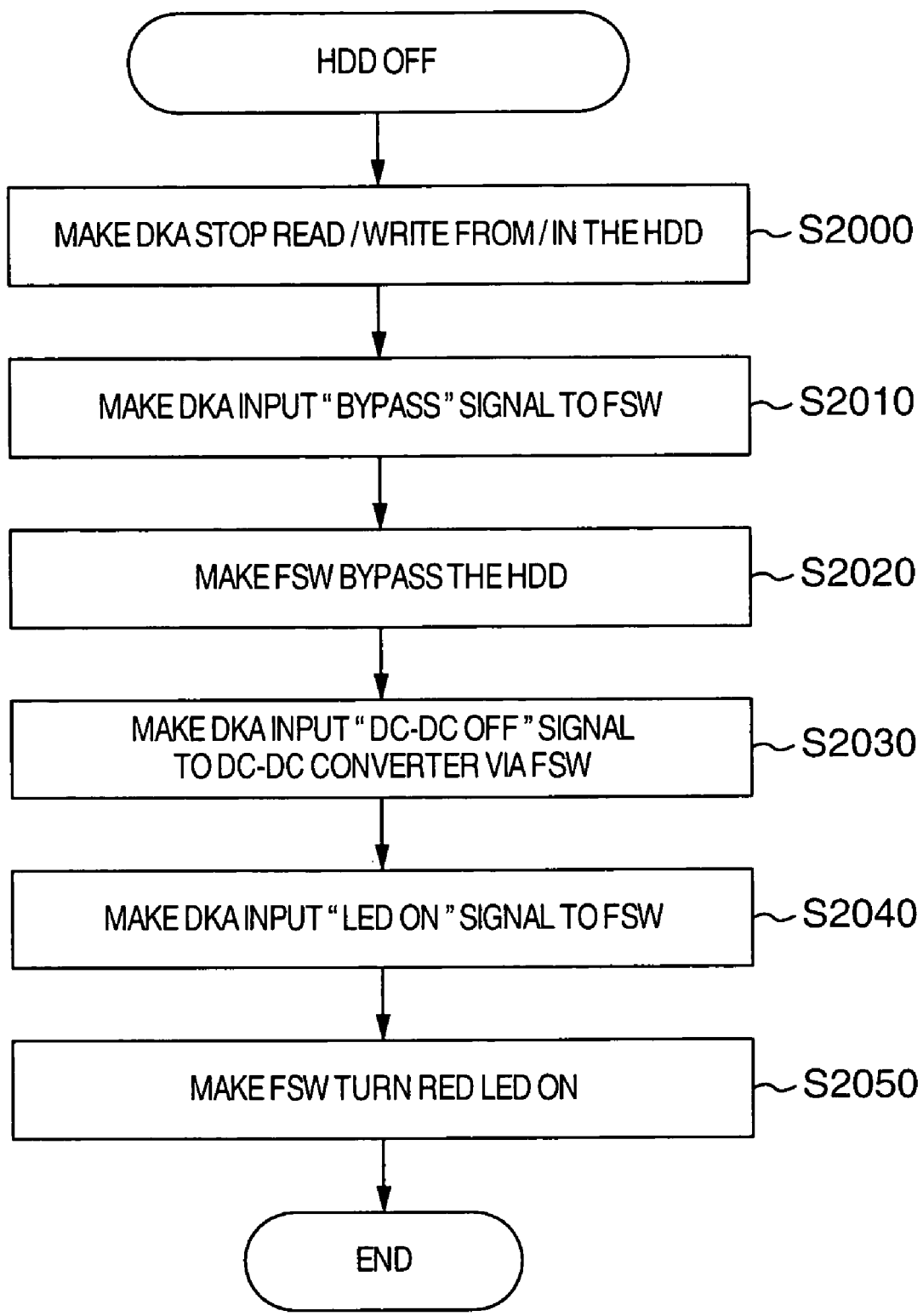
FIG. 11 is a flow chart for explaining a process of turning the disk drive off in this embodiment.

FIG. 11 is a flow chart showing the process of turning the disk drive 311 off. The disk drive 311 is turned off as follows. First, the disk adapter 134 interrupts reading/writing of data from/in the disk drive 311 among data transmitted from the channel adapter 131 (S2000). Then, the disk adapter 134 inputs a "BYPASS" signal to the control portion 152 of the FSW 150 (S2010). The "BYPASS" signal is a signal for separating the disk drive 311 from the FC-AL loop. Then, the control portion 152 outputs a select signal to select the "0" input of the multiplexer 151 to which the disk drive 311 is connected (S2020). As a result, the disk adapter 134 is disabled from communicating with the disk drive 311. At this point of time, the disk drive 311 is turned off. At this point of time, the DC-DC converter 313 of the disk drive unit 310 is however operating. Then, the CPU 160 of the disk adapter 134 inputs a "DC-DC OFF" signal to the DC-DC converter 313 via the control portion 152 of the FSW 150 (S2030). The "DC-DC OFF" signal is a signal for turning the DC-DC converter 313 off. As a result, the DC-DC converter 313 is turned off, so that the disk drive 311 is supplied with no power. Then, the CPU 160 of the disk adapter 134 inputs an "LED ON" signal to the control portion 152 of the FSW 150 (S2040). The "LED ON" signal is a signal for turning the red LED 314 on. Then, the control portion 152 turns the red LED 314 on (S2050). When the operator checks whether the red LED 314 is turned on, the operator can find that the disk drive unit 310 is enabled to be detached from the drive storage portion 320.

In this embodiment, because the on/off action of the disk drive 311 is processed in this manner, the disk drive 311 can be turned on/off in accordance with each disk drive unit 310. The aforementioned configuration of the connectors and pin lengths guarantees the disk drive unit 310 against failure in a case where the disk drive unit 310 is attached/detached when the "DC-DC ON" signal is supplied to the DC-DC converter 313, that is, when the DC-DC converter 313 is operating. Accordingly, hot swapping can be made. Incidentally, error occurs if the disk drive unit 310 is attached/detached in the middle of reading/writing of data from/in the disk drive 311. The concept "hot swapping" means the case where the disk drive unit 310 is attached/detached to/from the drive storage portion 320 when the DC-DC converter 313 is operating.

Processing at the Time of Failure in DC-DC Converter of Disk Drive Unit

Figure 12:
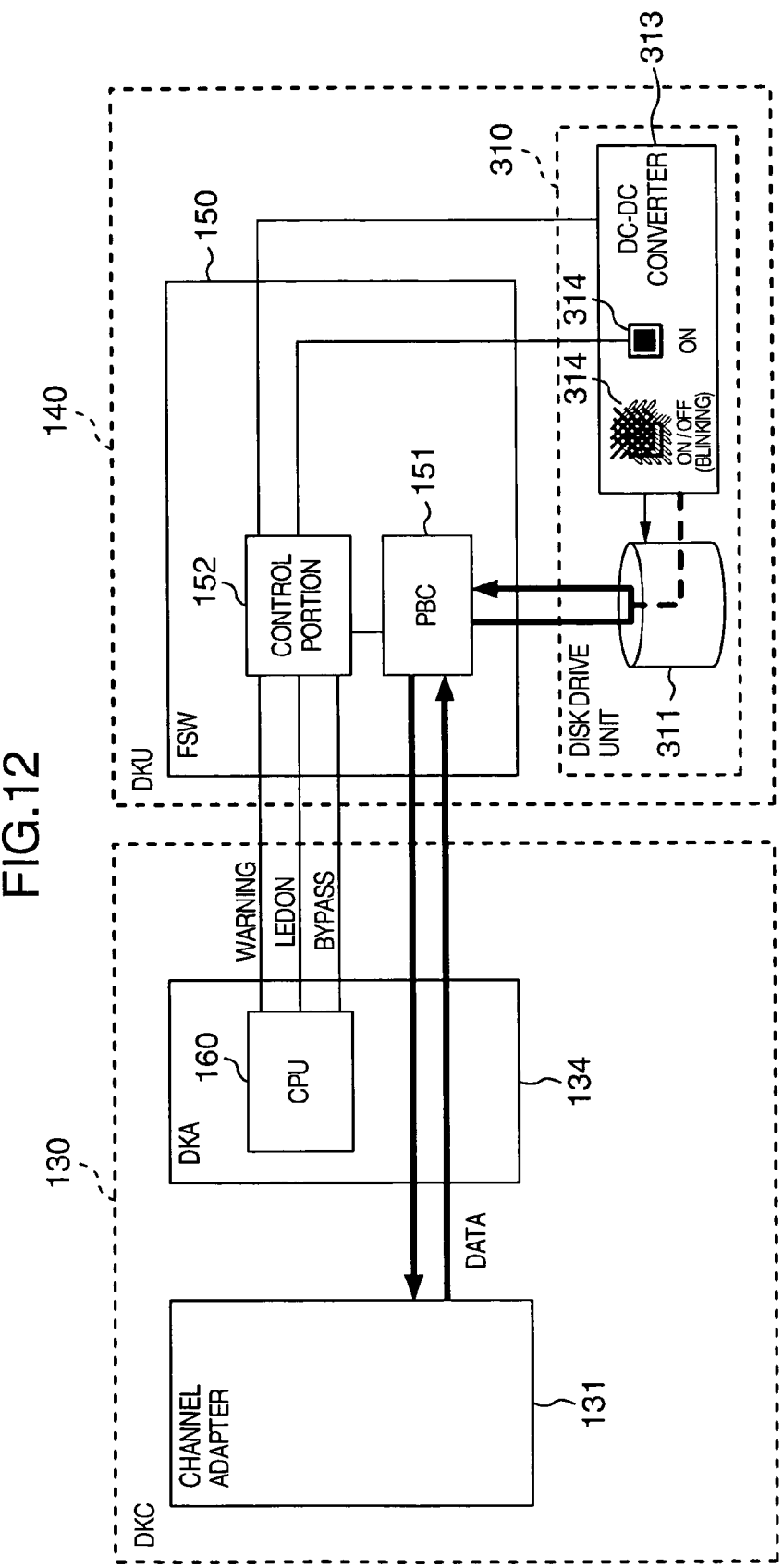
FIG. 12 is a diagram for explaining control for giving a notice of failure in a disk drive in this embodiment.
Figure 13:
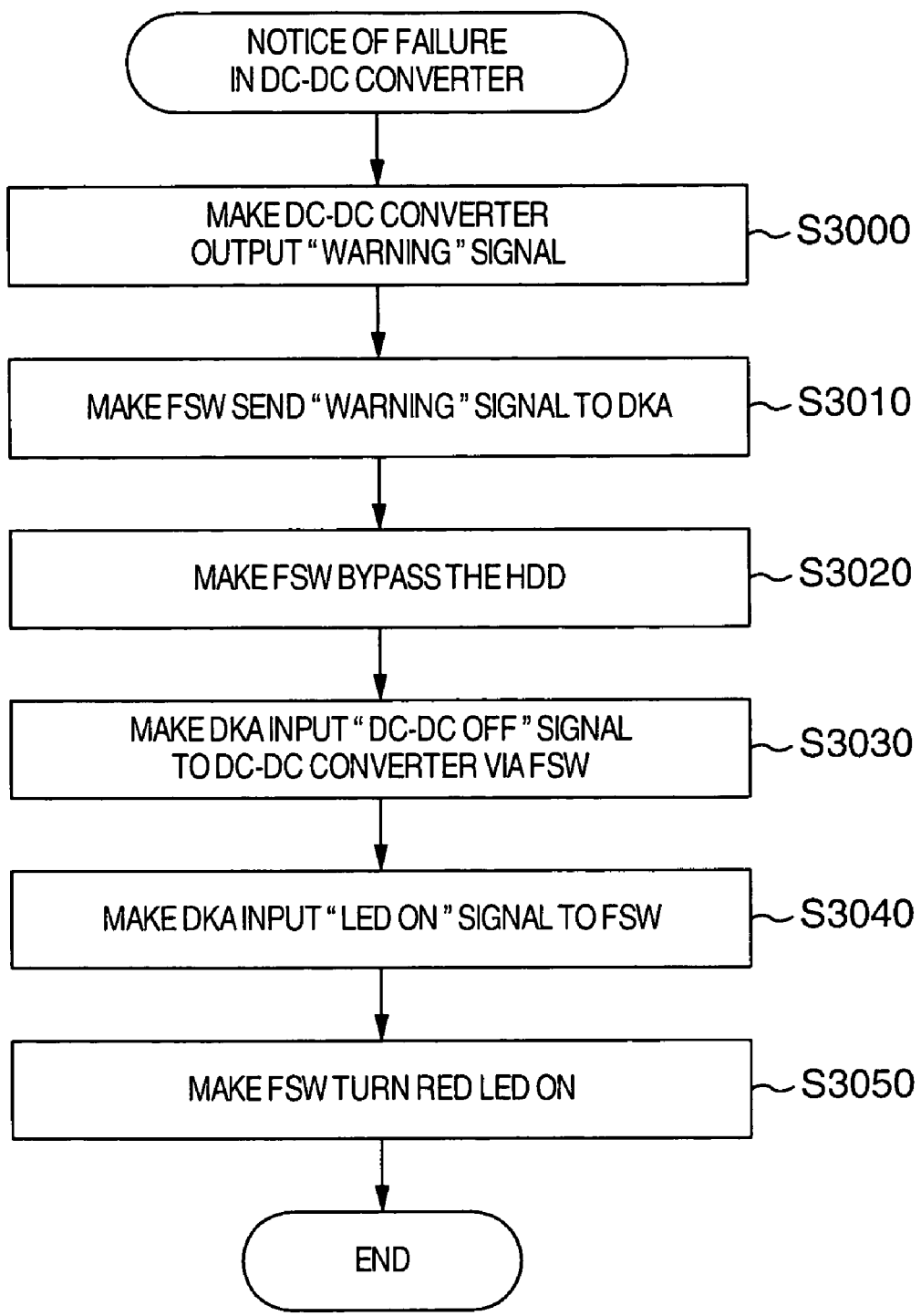
FIG. 13 is a flow chart for explaining a process for giving a notice of failure in a disk drive in this embodiment.

Processing at the time of failure in the DC-DC converter 313 of the disk drive unit 310 will be described below with reference to FIGS. 12 and 13.

Upon detection of some failure in the DC-DC converter 313, the DC-DC converter 313 first outputs a "WARNING" signal (S3000). The control portion 152 of the FSW 150 detects the "WARNING" signal and sends the "WARNING" signal to the CPU 160 of the disk adapter 134 (S3010). Then, the control portion 152 operates so that the disk drive 311 of the disk drive unit 310 having the DC-DC converter 313 outputting the "WARNING" signal is separated from the FC-AL loop (S3020). The separation is performed on the basis of the select signal that is output to select the "0" input of the multiplexer 151 to which the disk drive 311 is connected. Then, the CPU 160 of the disk adapter 134 inputs a "DC-DC OFF" signal to the DC-DC converter 313 via the control portion 152 of the FSW 150 (S3030). The "DC-DC OFF" signal is a signal for turning the DC-DC converter 313 off. As a result, the DC-DC converter 313 is turned off, so that the disk drive 311 is supplied with no power. Then, the CPU 160 of the disk adapter 134 inputs an "LED ON" signal to the control portion 152 of the FSW 150 (S3040). The "LED ON" signal is a signal for turning the red LED 314 on. The control portion 152 turns the red LED 314 on (S3050). As a result, the operator can find that the disk drive unit 310 is enabled to be detached from the drive storage portion 320.

The disk array system according to this embodiment is configured in this manner so that the disk drive units 310 can be individually controlled to be turned on/off or detached at the time of failure. Accordingly, improvement in facilitation and efficiency in maintenance of the disk array system can be attained.

Operating State of Disk Drive Indicated by LED

In the disk array system according to this embodiment, LEDs 314 are provided in the canister 312 of each of the disk drive units 310. Accordingly, visibility of the LEDs 314 is improved to make it easy to grasp the operating state of each disk drive unit 311.

Figure 14:
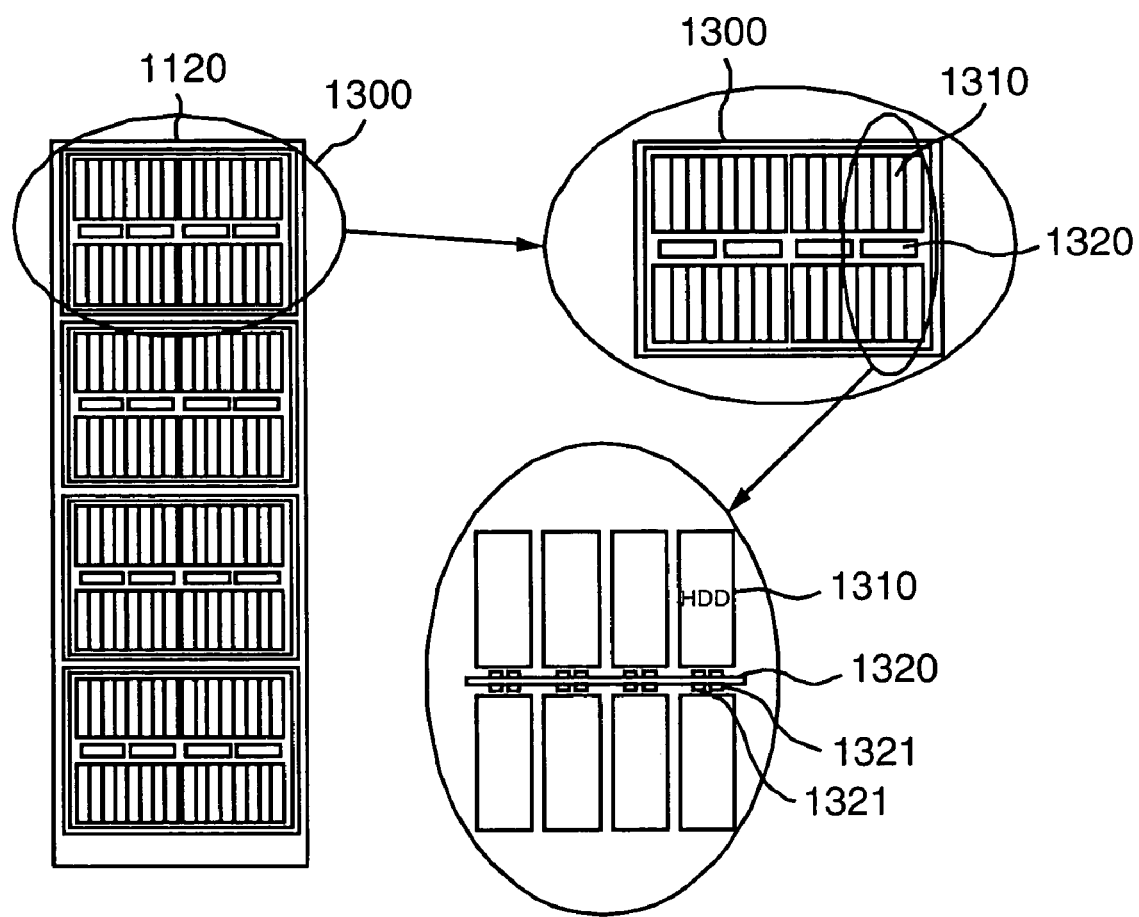
FIG. 14 is a view showing an example in which LEDs for indicating operating states of disk drives are mounted in another disk array system.
Figure 15:
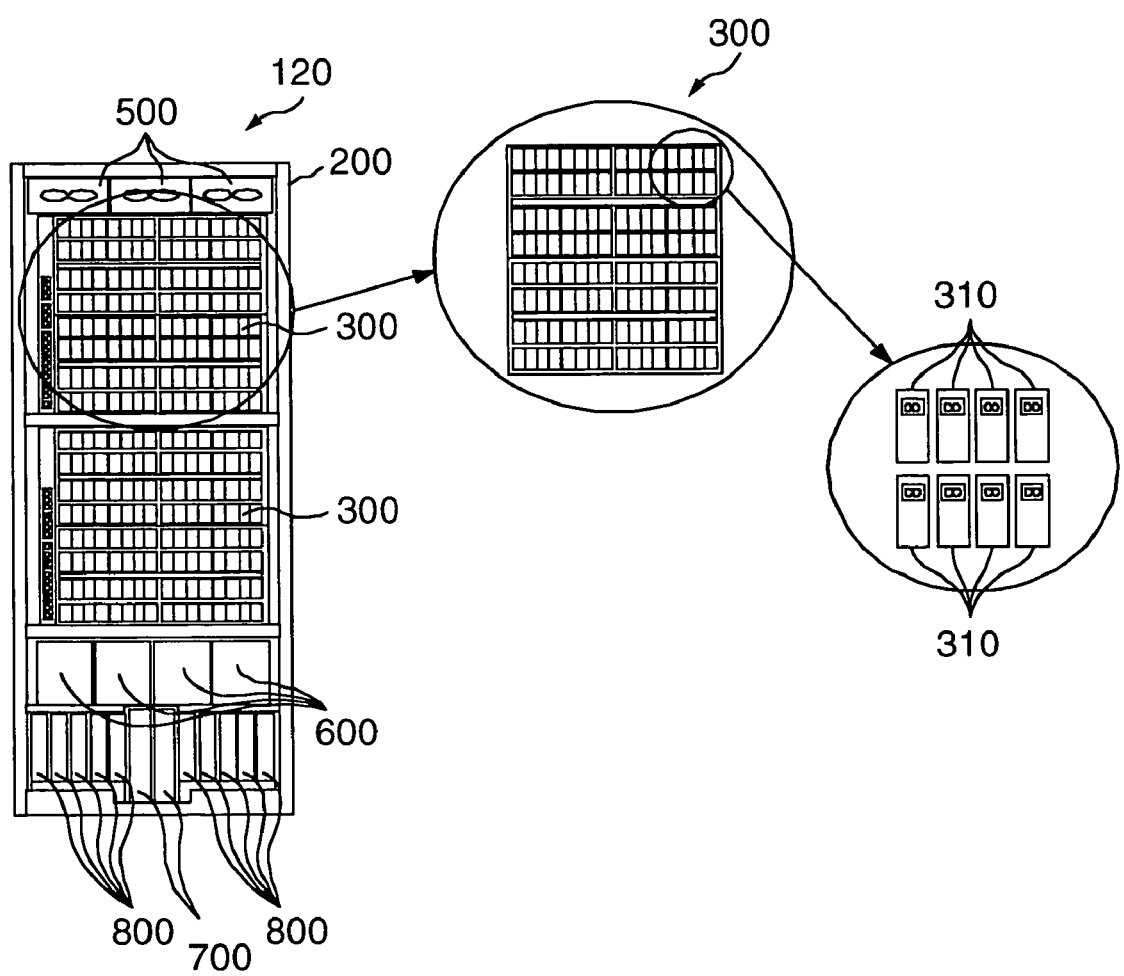
FIG. 15 is a view showing an example in which LEDs for indicating operating states of disk drives are mounted in the disk array system according to this embodiment.

FIG. 14 is a view showing visibility of LEDs 1321 in another disk array system. FIG. 15 is a view showing visibility of the LEDs 314 in the disk array system 100 according to this embodiment. It is obvious from comparison between FIGS. 14 and 15 that the disk array system 100 according to this embodiment is improved in the visibility of the LEDs 314 for indicating the operating state of each disk drive 311.

In another embodiment of the disk array system, 4 disk drive modules 1300 at the most can be stored in a casing of a drive station 1120. 16 disk drive units 1310 at the most can be stored in each of upper and lower stages in one disk drive module 1300. That is, 32 disk drive units 1310 in total can be stored in one disk drive module 1300.

In FIG. 14, each LED indication board 1320 is disposed so as to be sandwiched between upper and lower combinations of disk drive units 1310 stored in the upper and lower stages of a part of one disk drive module 1300. LEDs 1321 for indicating operating states of the disk drives of the disk drive units 1310 disposed in the upper stage and LEDs 1321 for indicating operating states of the disk drives of the disk drive units 1310 disposed in the lower stage are mounted on each LED indication board 1320. This is for the purpose of reducing the space used by the LED indication boards 1320 as extremely as possible on the basis of a great demand for reduction in size of the drive station 1120. That is, eight green LEDs 1321 and eight red LEDs 1321 are mounted on each LED indication board 1320 so that these LEDs 1321 can indicate the operating states of the disk drives of eight disk drive units 1310 separated into fours according to the upper and lower stages.

As described above, the other disk array system is configured so that each LED indication board 1320 is used for indicating the operating states of the disk drives of eight disk drive units 1310. For this reason, LEDs 1321 corresponding to the eight disk drive units 1310 are present on each LED indication board 1320 even in the case where the eight disk drive units 1310 are not present perfectly. Moreover, because the LEDs 1321 for indicating the operating states of the disk drives are mounted on front and rear surfaces of one board attached into a slight space between the upper and lower stages in which the disk drive units 1310 are disposed, the distance between adjacent LEDs 1321 is short. In order to easily distinguish the LEDs 1321 corresponding to each of the disk drive units 1310, and further, among LEDs disposed above disk drive units 1310 and LEDs disposed below disk drive units 1310 mixed as the LEDs 1321, in order to easily grasp the meaning of a certain LED 1321 as to the distinction of the operating state of the disk drive indicated by the certain LED 1321 when the certain LED 1321 is turned on, as shown in FIG. 15, the disk array system 100 according to this embodiment is configured so that LEDs 314 are provided in the canister 312 of each disk drive unit 310. For this reason, when a certain LED 314 is turned on, the meaning of the LED 314 as to the distinction of the operating state of the disk drive 313 indicated by the LED 314 can be grasped at a glance. Accordingly, because correspondence between the disk drive units 310 and the LEDs 314 is clarified to make it easy to check the operating states of the disk drives 313, maintenability of the disk array system 100 is improved. In addition, because it is unnecessary to provide any installation space for the LEDs 314 in the disk array system 100, reduction in size of the disk array system 100 can be achieved.

Although the best mode for carrying out the present invention has been described above, the aforementioned embodiment is for promoting a better understanding of the present invention but not for interpreting the present invention restrictively. The present invention may be changed or modified without departing from the gist of the present invention and may include changes or modifications equivalent to the aforementioned embodiment.

It should be further understood by those skilled in the art that although the foregoing description has been made on embodiments of the invention, the invention is not limited thereto and various changes and modifications may be made without departing from the spirit of the invention and the scope of the appended claims.

Contents of Japanese Patent Application Nos. 2003-351031 and 2003-351030 both filed on Oct. 9, 2003 in Japan are incorporated herein by reference.

What is claimed is:

1. A disk array system comprising:
    at least one channel control portion for receiving an input/output request of data from an information processor and exchanging said data with said information processor;
    at least one disk control portion for exchanging said data with a disk drive in accordance with said input/output request;
    a cache memory for storing said data exchanged between said channel control portion and said disk control portion;
    a cache switch for forming a communication path between said channel control portion and said cache memory;
    a shared memory for storing said input/output request exchanged between said channel control portion and said disk control portion;
    a plurality of disk drive units, each said disk drive unit including said disk drive, and a canister for storing said disk drive, said canister being provided with a Direct Current/Direct Current (DC/DC) converter connected to an Alternating Current/Direct Current (AC/DC) power unit and transforming an AC input to a DC output with a DC output value as a DC power input for a disk drive for supplying electric power to said drive device for driving said disk drive; and
    at least one drive storage portion connected to said plurality of disk drive units for detachably storing said disk drive unit,
    wherein said plurality of disk drive units are disposed adjacently, said canister of each of said disk drive units being provided with at least one Light Emitting Diode (LED) for indicating an operating state of said disk drive stored in said canister,
    wherein said drive storage portion includes a first connector in which first power unit pins for supplying electric power to said power unit provided in said canister of said disk drive unit, first ground potential supply pins for supplying ground potential and other pins are provided in parallel with an attaching/detaching direction of said disk drive unit,
    wherein said disk drive unit includes a second connector which is connected to said first connector and in which second power unit pins brought into contact with said first power unit pins at the time of said connection, second ground potential supply pins brought into contact with said first ground potential supply pins at the time of said connection and other pins are provided in parallel with the attaching/detaching direction of said disk drive unit, and
    wherein when said disk drive unit is attached to said drive storage portion, lengths of the respective pins are set so that said first power unit pins come into contact with said second power unit pins before said other pins of said first connector come into contact with said other pins of said second connector, and that said first ground potential supply pins come into contact with said second ground potential supply pins before said first power unit pins come into contact with said second power unit pins,
    wherein said other pins of said first connector include first power supply pins through which electric power derived from said power unit provided in said canister of said disk drive unit in order to drive said disk drive is once led to said drive storage portion,
    wherein said other pins of said second connector include second power supply pins which are brought into contact with said first power supply pins when said first and second connectors are connected to each other,
    wherein said drive storage portion includes a third connector in which third power supply pins through which said electric power derived from said power unit and once led to said drive storage portion is supplied to said disk drive in order to drive said disk drive are provided in parallel with the attaching/detaching direction of said disk drive unit,
    wherein said disk drive unit includes a fourth connector which is connected to said third connector and in which fourth power supply pins brought into contact with said third power supply pins at the time of said connection are provided in parallel with the attaching/detaching direction of said disk drive unit, and
    wherein when said disk drive unit is attached to said drive storage portion, lengths of the respective pins are set so that said first power supply pins come into contact with said second power supply pins before said third power supply pins come into contact with said fourth power supply pins."

* * * * *